L. N. WATTS.
Automatic Liquid-Weigher.

No. 217,657. Patented July 15, 1879.

WITNESSES. INVENTOR.
James B. Lizius, Lewis N. Watts,
R. P. Daggett. PER
C. Bradford,
ATTORNEY.

UNITED STATES PATENT OFFICE.

LEWIS N. WATTS, OF INDIANAPOLIS, INDIANA.

IMPROVEMENT IN AUTOMATIC LIQUID-WEIGHERS.

Specification forming part of Letters Patent No. 217,657, dated July 15, 1879; application filed April 5, 1879.

*To all whom it may concern:*

Be it known that I, LEWIS N. WATTS, of the city of Indianapolis, county of Marion, and State of Indiana, have invented certain new and useful Improvements in Automatic Liquid-Weighers, of which the following is a specification, reference being had to the accompanying drawings, which are made a part hereof, and on which similar letters of reference indicate similar parts.

Figure 1:
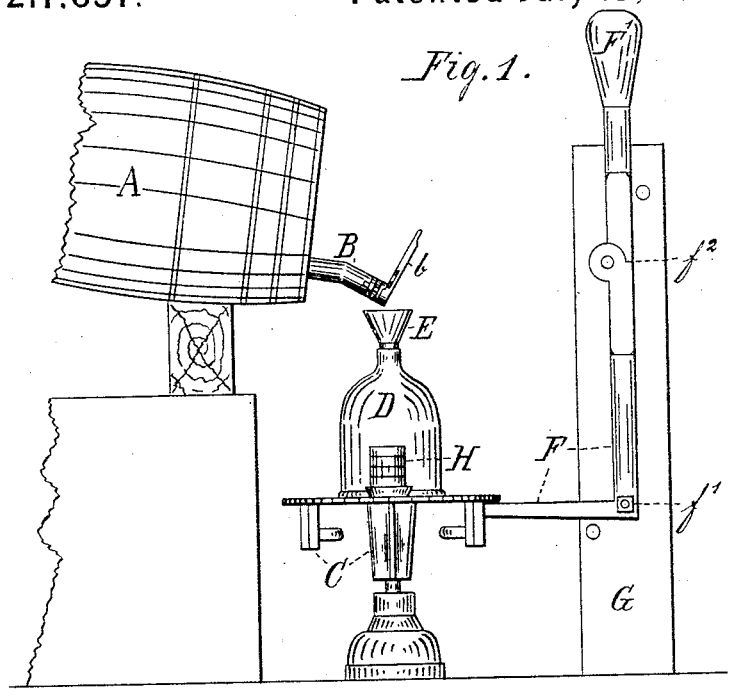
Figure 2:
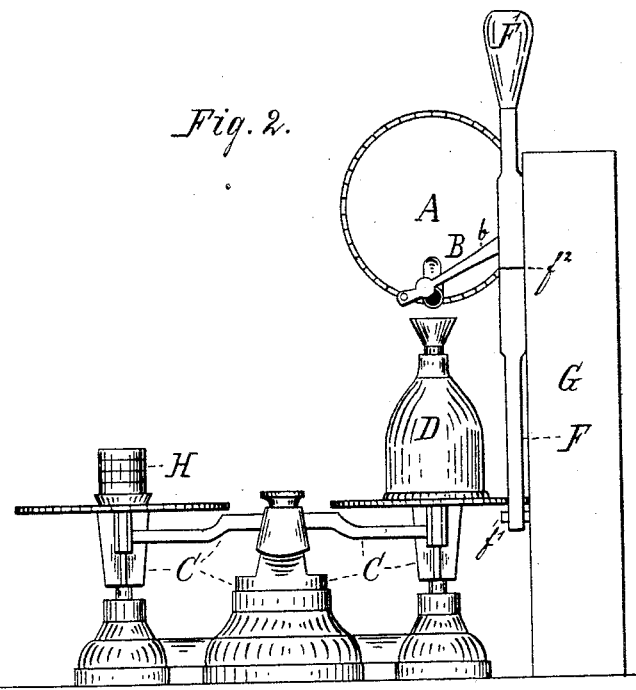

Figure 1 is a side elevation of a portion of a barrel for molasses or other liquid substance with my machine in position for use in connection therewith. Fig. 2 is a side elevation of the machine, looking toward the end of the barrel.

In said drawings, the portion marked A represents the barrel; B, the ordinary faucet thereto; C, a pair of common scales or balances, which may be of any suitable form or construction; D, a can or jug, which, when my device is used, is to set on the platform of the scales, said scales being so arranged as to bring the mouth of said jug, or of a tunnel therein, directly under the faucet B; E, a common tunnel; F, an elbow-lever, pivoted at $f^1$ to an upright, G, the horizontal arm of which projects under the scale or scale-beam, and the vertical arm of which is jointed at $f^2$, and has its upper end, F′, enlarged or weighted. H H are ordinary scale-weights.

The object of my invention is to produce a machine by which molasses and other liquids may be accurately measured by weight, and which shall automatically close the faucet when the required quantity has been drawn. This object is accomplished by the herein-described machine, which consists of an ordinary pair of scales, a common faucet, and a device automatically operated by said scales to close said faucet.

In operation, the scales, in connection with the weighted elbow-lever attachment, are placed in the proper relative position to the faucet of the barrel or other receptacle in which the liquid to be drawn is contained, so that the jug or can into which the desired quantity is to be drawn may set on the platform of the scale, and also so that the weighted end of the lever may be in such a position that it shall fall across the handle of the faucet when the lever is operated. The jug or can is then counterbalanced with weights, and enough more are added so that the scale will tip when the desired quantity of liquid has been drawn. The weighted end of the lever is then raised to a vertical position and the faucet opened.

When sufficient of the liquid has run into the jug to equal the specified weight, the scale tips, and, striking the horizontal arm of the elbow-lever F, throws the weighted end F′ out of poise, causing it to fall and strike the handle b, thus closing the faucet entirely and at once, immediately stopping the flow of the liquid, and insuring the utmost accuracy in the weight or measurement.

The advantages of this arrangement will be apparent when it is remembered that a considerable portion of the time of those employed in retail grocery establishments is taken up in watching the drawing of liquids to see that the vessels do not overflow, and the liquid thus become wasted. A large proportion of this time can be saved by the use of my device, and greater accuracy in the measurement may be obtained in nearly, if not quite, all cases than can be had under the old method.

While the desirability of the privilege of absence will be apparent to all, those in whose hands is the sole charge of an establishment will appreciate it most highly.

Having thus fully described my said invention, what I claim as new, and desire to secure by Letters Patent, is—

1. The combination of the scale, the elbow-lever F, pivoted at $f^1$ and jointed at $f^2$, and the ordinary faucet B, substantially as herein shown and specified.

2. In combination with a faucet and a pair of scales, a hammer-like device independent of said faucet, and pivoted to a post or other device independent of the scale mechanism, but operated by said scales to fall upon and close said faucet, substantially as and for the purpose set forth.

In witness whereof I have hereunto set my hand and seal at Indianapolis, Indiana, this 31st day of March, A. D. 1879.

LEWIS N. WATTS. [L. S.]

In presence of—
C. BRADFORD,
L. W. FREDERICK.